Patented Oct. 3, 1922.

1,430,899

UNITED STATES PATENT OFFICE.

FRITZ GÜNTHER, OF LUDWIGSHAFEN-ON-THE-RHINE, GERMANY, ASSIGNOR, BY MESNE ASSIGNMENTS, TO BADISCHE ANILIN & SODA FABRIK, OF LUDWIGSHAFEN-ON-THE-RHINE, BAVARIA, GERMANY, A CORPORATION OF THE GRAND DUCHY OF BADEN.

MANUFACTURING YELLOW COLORING MATTERS FOR DYEING ANIMAL FIBERS.

No Drawing.     Application filed July 9, 1920.   Serial No. 395,137.

(GRANTED UNDER THE PROVISIONS OF THE ACT OF MARCH 3, 1921, 41 STAT. L., 1313.)

*To all whom it may concern:*

Be it known that I, FRITZ GÜNTHER, citizen of Germany, residing at Ludwigshafen-on-the-Rhine, Germany, have invented new and useful Improvements in Manufacturing Yellow Coloring Matters for Dyeing Animal Fibers (for which I have made application in Germany April 14, 1914, Patent No. 289,111; in Switzerland Feb. 4, 1915, and April 10, 1915, Patent Nos. 70,442, 71,285, and 71,418), of which the following is a specification.

The present invention relates to new coloring matters dyeing animal fiber, especially wool, yellow shades of excellent properties. The new dyestuffs can be obtained either by condensing sulfonic acids of aromatic aldehydes with o-nitraniline or with derivatives thereof having the para position to the $NH_2$ group unsubstituted or by condensing an aromatic aldehyde with ortho-nitraniline or its derivatives having the para position to the $NH_2$ group unsubstituted and subsequently sulfonating the condensation product thus obtained. The last mentioned product is, generally, not uniform but composed of the reaction compound of 1 mol. proportion of aldehyde with 2 molecular proportions of ortho-nitraniline as its chief constituent and of other products representing probably products of a further reaction of aldehyde with the said compounds. The sulfonation can be carried out either with this reaction product directly in the compound state or with its single constituents.

The dyestuffs obtained by this process are distinguished by their valuable shades, their very good even-dyeing power and by excellent fastness, e. g. to milling and washing.

In order to further illustrate the nature of this invention I give the following examples which, however, can be departed from in various directions. The invention is not confined to the examples. The parts are by weight.

*Example 1.*

50 parts of a condensation product (prepared by heating, for about 8 hours, 66 parts of ortho-nitraniline, 21 to 61 parts of benzaldehyde and 200 parts of hydrochloric acid of 21° Bé. to about 85° centigrade, whilst stirring, then removing the excess of nitraniline or of benzaldehyde respectively by steam distillation and drying on the water bath the product obtained, freed from hydrochloric acid) are introduced into 300 parts of sulfuric acid of 66° Bé. and sulfonated at about 85° C. until a test is clearly soluble in sodium carbonate solution. The mass is then poured into a solution of common salt, the dyestuff which precipitates filtered off and converted into the sodium salt. If a purer condition is desired, the calcuim salt may be first produced and then transformed into the sodium salt.

In case the single constituents of the product resulting from the condensation of ortho-nitraniline with benzaldehyde shall be sulfonated separately, the crude condensation product may be treated, in a finely powdered state, with hydrochloric acid of about 25 per cent strength, a part of the product varying according to the quantity of benzaldehyde employed for the condensation going into solution thereby, which part can again be precipitated from the filtered solution by diluting with about the same volume of water.

The product soluble in the 25% hydrochloric acid and precipitated therefrom as well as the remainder left by the separation are treated with sodium carbonate, dried and, if desired after a suitable purification, sulfonated as above described.

The dyestuffs obtained in this manner dye wool in greenish yellow shades and are distinguished by a good even-dyeing power and excellent fastness, particularly to light, washing, milling, acid and alkalies.

*Example 2.*

14 parts of o-nitraniline are fused, mixed with 6.5 parts of benzaldehyde and then well stirred with 25 parts of sodium bisulphate of about 71 per cent $NaHSO_4$ (besides Glauber's salt). The mixture is heated at 100° for 15 or 16 hours on the water bath. The melt, cooled and powdered, is then sulfonated by means of 120 parts of sulfuric acid of 66° Bé. at 95° C. until a test is clearly soluble in sodium carbonate solution. The product can be treated as described in the foregoing example.

*Example 3.*

20 parts of 3-chloro-6-nitro-1-aminobenzene are heated to from 90 to 95° C. for about 5 hours with 120 parts of hydrochloric acid of 21° Bé. and 10.4 parts of sodium benzaldehyde-m-sulphonate. The condensation product which separates out is washed with little hydrochloric acid, dissolved in dilute sodium carbonate solution then freed from chloro-nitraniline that may be present, by extracting with ether, precipitated by means of common salt solution, sucked off and dried. The product dissolves in strong hydrochloric acid nearly colorless and on adding to the solution thus obtained some solid potassium dichromate a violet coloration or precipitate is produced, which on dilution with water turns greenish yellow.

The process can be carried out in an analogous way if, instead of benzaldehyde, other aromatic aldehydes, or, instead of o-nitraniline, substitution products thereof having a free para position are employed.

In case the aromatic aldehyde employed already contains a sulfonic acid group, a further sulfonation can be dispensed with.

What I claim is:—

1. As a new article of manufacture yellow, water-soluble dyestuffs derived from an aromatic aldehyde and an orthonitraniline compound with the position para to the $NH_2$ group unoccupied and being substituted, in an aldehyde residue, by at least one sulfonic acid group, which dyestuffs dye wool even shades of excellent fastness.

2. A process for manufacturing yellow coloring matters suitable for dyeing animal fibers characterized by condensing an aromatic aldehyde with an ortho-nitraniline compound having the para position to the $NH_2$ group unsubstituted and sulfonating the condensation product thus obtained.

In testimony whereof I have hereunto set my hand.

Dr. FRITZ GÜNTHER.